J. Draper.
Hoop Skirt.
Nº 25701 Patented Oct. 4, 1859.
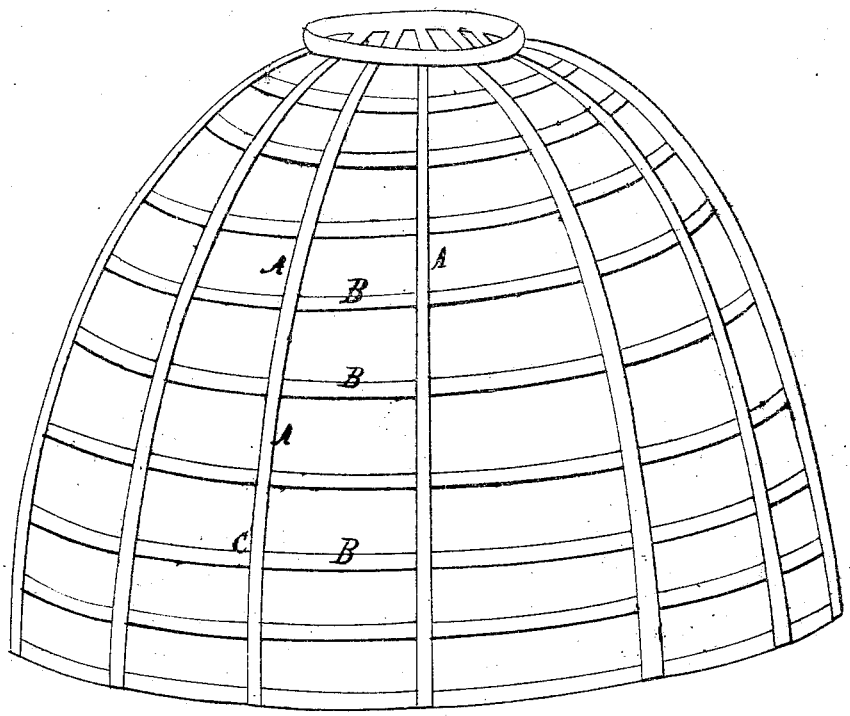
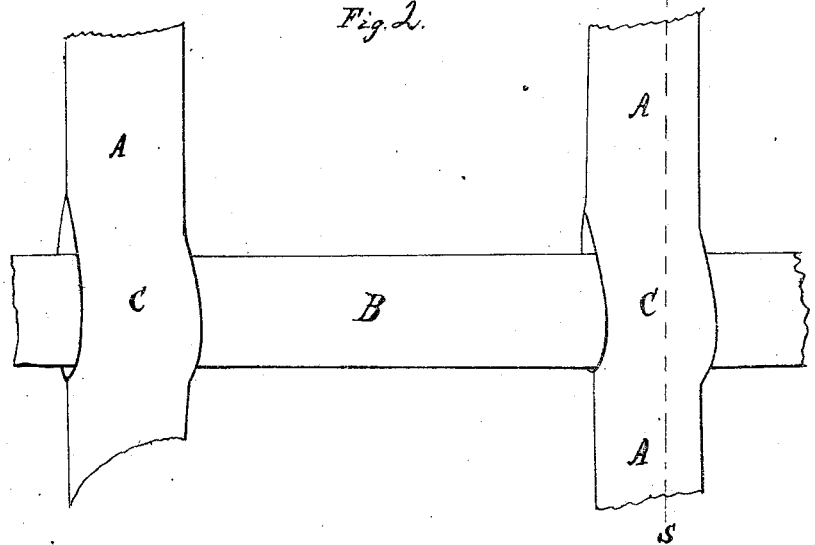
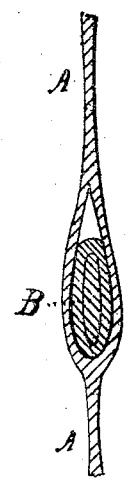
Witnesses.
Thomas D. Stetson
Wm B. Smith
Inventor.
J. Draper

UNITED STATES PATENT OFFICE.

JAMES DRAPER, OF NEW YORK, N. Y, ASSIGNOR TO HIMSELF AND SAMUEL H. DOUGHTY, OF SAME PLACE.

SKELETON SKIRT.

Specification forming part of Letters Patent No. 25,701, dated October 4, 1859; Reissued December 27, 1859, No. 870.

*To all whom it may concern:*

Be it known that I, JAMES DRAPER, of the city, county, and State of New York, have invented a certain new and Improved Construction of Skeleton Skirts; and I do hereby declare that the following is a full and exact description of the same, which I have prepared with a view to the obtaining of Letters Patent therefor, and that the same is illustrated in the accompanying drawings, forming a part of this specification.

My invention consists in a new manufacture of skeleton skirt, in which the hoops are secured by glue or equivalent cement between separately woven parts of the tapes.

My invention is applicable to all sizes and varieties of skeleton skirts. It is superior to other manufactures, inasmuch as it is more cheaply produced, and there are no stitches to rip or clasps to fail. In its complete form, *i. e.*, with the hoops cemented between woven parts, it is also superior to all others, as it confines the hoops between the parts instead of on the side of a single ordinary tape, and the embracing of the hoops between the woven material, in this manner aids in sustaining the parts in contact while the cement is hardening, and also aids the cement in resisting any force tending to disturb the union of the parts.

To enable others skilled in the art to make and use my invention, I will proceed to describe it by the aid of the drawings.

I prefer to produce my skirts in the manner shown in an application for patent for skirt made by me on or about the 16th of March, 1859, and now very generally known as the "woven skeleton skirt." I can, however, if the loom is not adapted for such work, weave the tapes in a similar manner, except that the hoops are not inserted while the tapes are in the loom, and after their removal from the loom, I can insert the hoops, thrusting them through each tape singly. In such cases, I make the spaces therefor larger than the hoops, so that the latter can be easily inserted. I adjust the tapes properly on the hoops by hand, and then cement each tape to each hoop at the point where they intersect. The glue when it hardens causes the two parts to adhere very strongly and to resist all forces tending to induce a separation or any improper movement of the parts relatively to each other.

Figure 1 shows my skirt complete, A A being the tapes, B B the hoops, and C C the joints or intersections. Fig. 2 shows a perspective view of the joints on a much larger scale; and Fig. 3 shows a section taken on the line S S, in Fig. 2.

Similar letters of reference denote like parts in all the drawings.

The red portion D indicates the glue or equivalent cement, which must be applied while in a soft state, and the parts must remain in contact for a sufficient period to allow the cement to harden before they are subjected to any force tending to separate or move them relatively to each other. They then become very securely united, and may be used in the same manner as any other skeleton skirts. Any cement which will adhere strongly to both A and B may be used in lieu of glue if preferred.

Having now fully described my invention, what I claim as new therein, and desire to secure by Letters Patent, is—

The new manufacture of skeleton skirt herein described, in which the hoops B are secured by glue or equivalent cement between separately woven parts of the tapes in contradistinction to the stitched or clasped skirt, when the parts are woven together as single tapes between the hoops and separately as distinct tapes at the points where the hoops are received.

In witness whereof I have hereunto set my hand.

J. DRAPER.

Witnesses:
THOMAS D. STETSON,
WM. B. SMITH.